Figure 1:
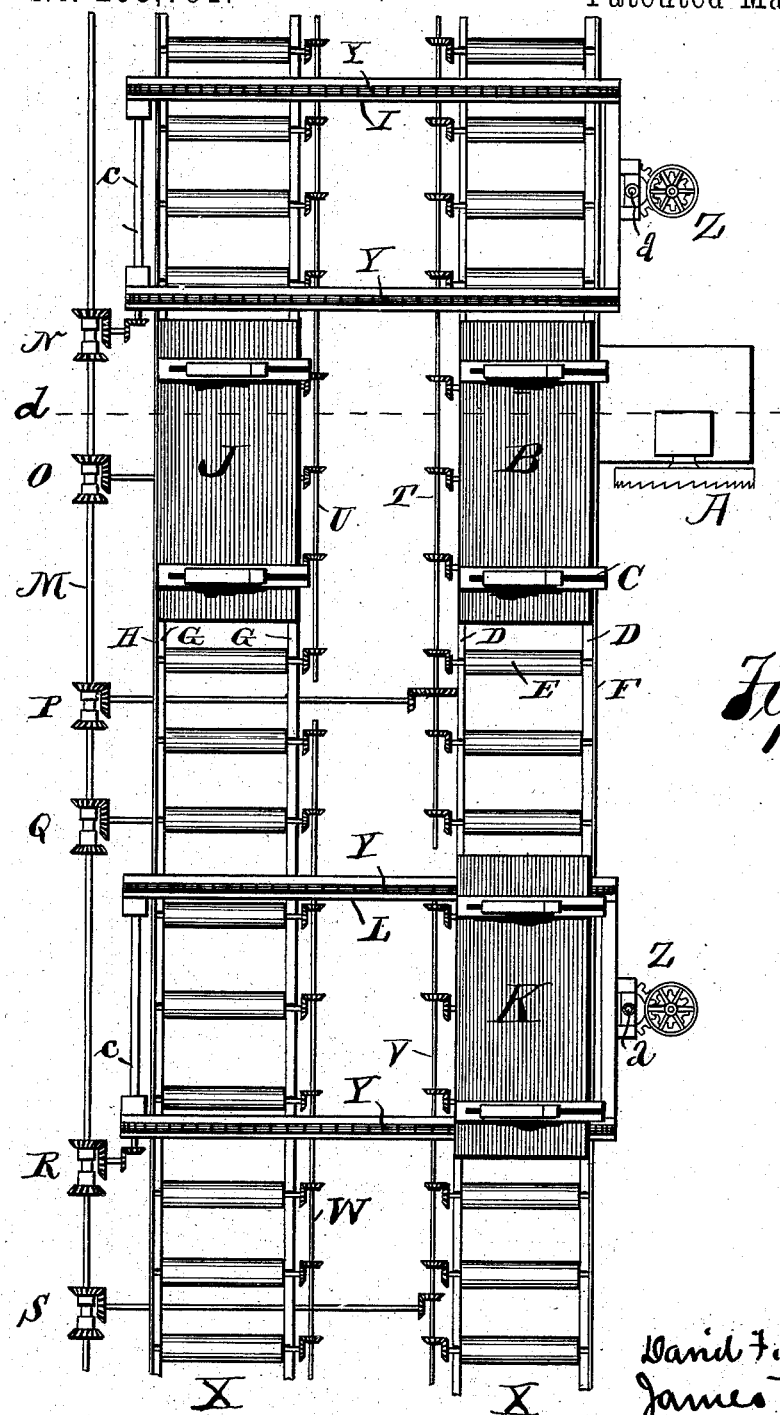

(No Model.) 2 Sheets—Sheet 1.

D. F. & J. T. MILNE.
SAW MILL.

No. 295,791. Patented Mar. 25, 1884.

Witnesses:

Inventors
David F. Milne
James T. Milne
by James W. See
Attorney

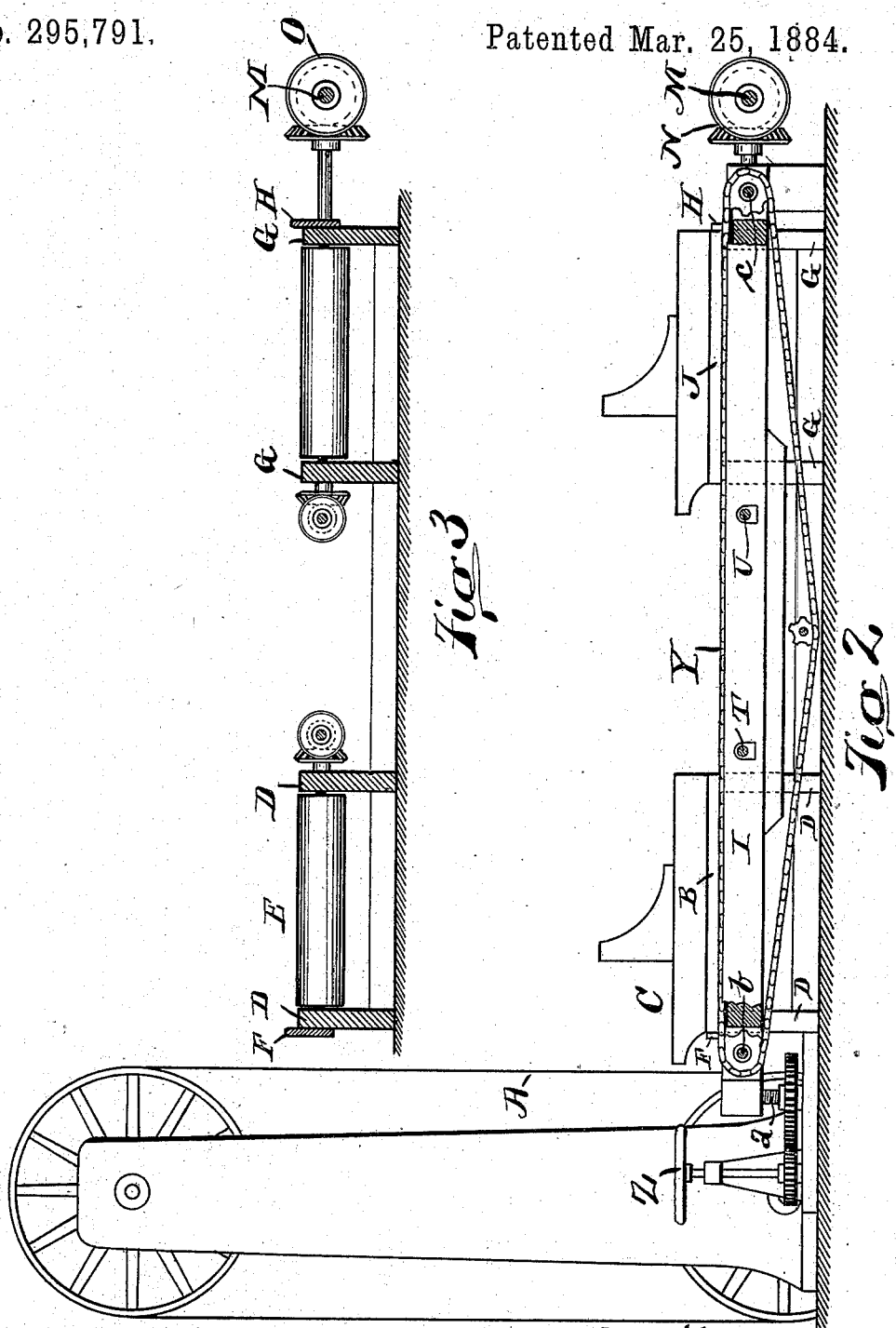

UNITED STATES PATENT OFFICE.

DAVID FERGUSON MILNE, OF ROCHESTER, NEW YORK, AND JAMES THOMPSON MILNE, OF CLAY CITY, KENTUCKY.

SAW-MILL.

SPECIFICATION forming part of Letters Patent No. 295,791, dated March 25, 1884.

Application filed December 22, 1883. (No model.)

*To all whom it may concern:*

Be it known that we, DAVID F. MILNE, of Rochester, Monroe county, New York, and JAMES T. MILNE, a citizen of Great Britain, and a resident of Clay City, Powell county, Kentucky, have invented certain new and useful Improvements in Saw-Mills, of which the following is a specification.

In ordinary saw-mills the log-carriage runs past the saw upon a track, being fed at the proper speed while the saw is cutting and gigging back rapidly to be set for a new cut. At the end of the cut, while the carriage motion is being arrested, and during the gigging motion, and during the arresting of the gigging motion, and during the inauguration of the cutting motion, the saw is practically idle. The rapid gigging motion is apt to take the carriage farther back than is necessary, causing an extra length of travel in the cutting direction. The log must be set forward for each new cut, and when one log is exhausted a new log must be placed, and the carriage must frequently stand while logs are being turned. Taking all the waste of time and motion into consideration, it is probably safe to say that the saw is not cutting one-half of the working time. The gigging of the log back past the saw causes the saw to scarify the face of the log and make bad lumber. Attempts are made to remedy this by the use of offsetting-carriages, and by the vicious practice of leading the saw, much to the damage of the saw.

The object of our invention is to so construct a saw-mill that the saw may cut practically continuously, regardless of setting new logs, turning the logs, or setting for the board, and that all scarifying of lumber due to gigging may be avoided.

The invention will be understood from the following description, taken in connection with the accompanying drawings, in which—

Figure 1 is a plan of a saw-mill illustrating our improvements; Fig. 2, an end elevation of the same, and Fig. 3 a transverse section on the line *d* of Fig. 1.

In the drawings, A represents the saw, in this case shown as a band-saw; B, the log-carriage; C, head-blocks on the carriage; D, carriage-ways past the saw, as usual; E, carriage-carrying rollers journaled in the carriage-ways; F, a side guide on one of the carriage-ways, against which one edge of the carriage may run and be guided; G, a second set of carriage-ways parallel to the first set, and fitted with rollers in a similar manner; H, a side guide on the second carriage-ways; I, a transfer arranged beyond the saw to move the carriage, with its log, from one set of carriage-ways to the other; J, a carriage similar to the one first mentioned; K, a third carriage of similar kind; L, a second transfer similar to the transfer I, but located some distance in front of the saw; M, a line-shaft for giving motion to the transfer and to the rollers of the carriage-ways; N, gearing by which motion is transmitted from the line-shaft to the mechanism of the first transfer; O, similar gearing for the first section of the second carriage-way; P, similar gearing for that portion of the first carriage-way which passes the saw; Q, similar gearing for the second section of the second carriage-way; R, similar gearing for the second transfer; S, similar gearing for the first section of the first carriage-way; T, U, V, and W, shafts for the rollers of each section of carriage-way; X, outer ends of the carriage-ways; Y, the motor-chains of the transfers; Z, hoists for raising the transfers into engagement with the carriages; *a*, the screws of the transfer-hoists; *b*, the tail-shafts of the transfers, and *c* the head-shafts of the transfers.

Assume a log secured to the carriage B as being cut by the saw, the carriage being fed at proper speed toward the upper end of Fig. 1. A log upon the carriage K is following closely after, and is ready for the saw as soon as the first log shall have passed. After the carriage B passes the saw it proceeds on to the transfer I, which lies a trifle below the top of the rollers. The transfer being raised, causes the carriage to be lifted from the rollers and to be supported by the moving chains of the transfer, which quickly shifts the carriage sidewise to the second carriage-way, where it may run downward to the second transfer, where it may shift sidewise to the first carriage-way again. While the carriage is upon the second carriage-way its log may be set or turned, or a new log may be put on.

The carriage-ways may be extended indefinitely at X, whereby the carriages may run outward to a log-yard or overturning machinery, and in such extension of the carriage-ways as many transfers may be located as expedience may suggest.

The gearing which actuates the carriage as it passes the saw is so arranged as to give the proper cutting speed; but all the other carriage movements are to be at much higher speed. By these means the second log can always be kept closely following the one being sawed, and ample time is given for log manipulation while the carriage is not at the saw.

We show three carriages, but more may obviously be used, and the circuit principle may be executed with two carriages, one running quickly back on one carriage-way, while another is at the saw, and even with a single carriage that feature of the improvements which avoids gigging in contact with the saw may be utilized.

The transfers are of ordinary construction, consisting of rectangular frames pivoted upon their head-shafts, by which motion is transmitted to their chains through the usual sprocket-wheels, the tail of the chains being carried by idle-sprockets, and the transfers being brought into engagement with the carriages by hoisting the tail end of the transfer.

It should be fully understood that where use is made of a single carriage only, such carriage passes up one carriage-way and down the other, and that setting, turning, logging, &c., can be done at any point in the circuit-like pathway of the carriage, except directly at the saw; that by the use of two carriages one log upon a carriage may be manipulated while another log is at the saw, and that by the use of three carriages one log may be at the saw, one log closely following after it, and one log be in process of manipulation.

We do not confine ourselves to the arrangement of gearing shown, nor to the means for moving the carriages as shown, nor to the means of sawing as shown. We explain the principle of our invention and the best mode in which we contemplate applying the principle.

A shingle-machine has been devised in which an endless track is provided for the block-carriages, which pass the saw in circuit and receive adjustment for new cut at some idle point in the circuit. Such a construction, while permissible in a shingle-machine working short blocks, is clearly inadmissible in saw-mill construction, where the extreme length of logs prevents the running of carriages upon an endless track, or on tracks circularly arranged; hence in our construction we do not turn the carriage end for end when bringing it down the return-track, but transfer it bodily from one track to the other. Again, the circular system will not admit of the carriages being withdrawn from the circuit and run to the log-yard, or being stopped on the circuit for manipulation, or being hurried up after a delay.

We call attention to, and herein take recognition of, the endless track, or round-about system of track, in order that we may disclaim it as of our invention.

We claim as our invention—

In a saw-mill, the combination of a saw, a carriage-way provided with carriage-moving mechanism, and located so as to form a carriage-pathway past the saw, a second similarly-provided carriage-way disposed parallel thereto, one or more log-carriages fitted to move on said carriage-ways, and two or more transfers located one before and one after the saw, and adapted to shift said carriage or carriages from one carriage-way to the other, substantially as and for the purposes specified.

DAVID FERGUSON MILNE.
JAMES THOMPSON MILNE.

Witnesses as to D. F. Milne:
GEORGE H. DUNBAR,
GEORGE P. MCARTHUR.
Witnesses as to J. T. Milne:
GEO. M. READ,
LABAN T. MANSFIELD.